(12) United States Patent
Singnal et al.

(10) Patent No.: US 12,325,560 B2
(45) Date of Patent: Jun. 10, 2025

(54) CONTAINERS HAVING TAMPER EVIDENT FEATURES AND METHODS RELATED THERETO

(71) Applicant: PI INDUSTRIES LIMITED, Udaipur-Rajasthan (IN)

(72) Inventors: Mayank Singnal, Udaipur-Rajasthan (IN); Kishor Nagarkar, Gujarat (IN)

(73) Assignee: PI INDUSTRIES LTD., Udaipur Rajasthan (IN)

( * ) Notice: Subject to any disclaimer, the term of this patent is extended or adjusted under 35 U.S.C. 154(b) by 55 days.

(21) Appl. No.: 18/034,098

(22) PCT Filed: Oct. 27, 2021

(86) PCT No.: PCT/IB2021/059918
§ 371 (c)(1),
(2) Date: Apr. 27, 2023

(87) PCT Pub. No.: WO2022/090952
PCT Pub. Date: May 5, 2022

(65) Prior Publication Data
US 2023/0382604 A1    Nov. 30, 2023

(30) Foreign Application Priority Data

Oct. 29, 2020   (IN) .............................. 202011047199
Dec. 22, 2020   (IN) .............................. 202011055737

(51) Int. Cl.
*B65D 41/34*     (2006.01)
*B65D 47/40*     (2006.01)
*B65D 51/22*     (2006.01)
*B65D 51/24*     (2006.01)

(52) U.S. Cl.
CPC ........ *B65D 41/3409* (2013.01); *B65D 47/40* (2013.01); *B65D 51/223* (2013.01); *B65D 51/245* (2013.01)

(58) Field of Classification Search
CPC ............ B65D 41/3409; B65D 41/3423; B65D 51/223
USPC ....................................................... 215/200
See application file for complete search history.

(56) References Cited

U.S. PATENT DOCUMENTS

| | | | |
|---|---|---|---|
| 4,998,988 A | | 3/1991 | Zinnbauer |
| 5,975,320 A | * | 11/1999 | Bietzer ................. B65D 1/023 215/256 |
| 9,694,948 B1 | * | 7/2017 | Pakhomov ......... B65D 41/3409 |

(Continued)

OTHER PUBLICATIONS

PCT Isr (PCT/IB2021/059918)—Feb. 22, 2022 (3 pgs).
PCT Wr Opn (PCT/IB2021/059918)—Feb. 22, 2022 (5 pgs).

*Primary Examiner* — Anthony D Stashick
*Assistant Examiner* — Raven Collins
(74) *Attorney, Agent, or Firm* — Lippes Mathias LLP

(57) ABSTRACT

A container (10) having tamper evident features comprising: a bottle (12) having a neck (34) with an opening (14) at a distal end (16) and a base (20) at a proximal end (18) thereof; a cap (22) received on the neck (34) and movably retained on the bottle (12) wherein the cap (22) includes a first tamper evident feature (24) to provide an indication of tampering to an end user, the cap (22) further includes a second tamper evident feature (32) which becomes visible only when the first tamper evident feature (24) removed partially or completely from the bottle (12).

25 Claims, 19 Drawing Sheets

(56) References Cited

U.S. PATENT DOCUMENTS

2017/0233148 A1\* 8/2017 Meyer .................. B65D 47/242
 215/40
2018/0319555 A1\* 11/2018 Sprick ................ B65D 41/0414
2018/0354689 A1 12/2018 Weir \* cited by examiner

CONTAINERS HAVING TAMPER EVIDENT FEATURES AND METHODS RELATED THERETO

This application is a National Stage Entry of International Application No. PCT/IB2021/059918, filed Oct. 27, 2021, which claims priority to Indian Application No. 202011047199, filed Oct. 29, 2020, and to Indian Application No. 202011055737, filed Dec. 22, 2020, the contents of which are incorporated by reference herein.

FIELD OF THE INVENTION

The present invention generally relates to containers and, more particularly, to improved containers having tamper evident features with readily observable indications to an end user of any potential tampering. The invention also relates to the methods associated with the containers having tamper evident features.

BACKGROUND OF THE INVENTION

The containers of the kind with which this invention relates to are used to contain a wide variety of products including both liquids and solids. Such containers vary widely in shape and size in that such containers usually have an upper portion or end forming a neck containing an opening through which the contents of the container are accessed, and a closing member in the form of container sealing cap or the like which is movably secured to the upper portion or end of the container body for closing the opening. The container is also having a base portion and the portion in-between the upper portion and the base portion defines the space which is used to store the contents of the container.

Conventionally, such containers were commonly closed by simple caps threaded or otherwise secured and/or sealed to the container necks. Over the years, tampering with such containers and contents thereof has become an ever-increasing problem and causes danger to the end user. Usually while tampering such containers involve inclusion of counterfeit products or harmful products. The use of re-usable caps or closures or seals carries the risk that any third party might remove the cap, tamper with the contents of the container, and reseal the container using re-sealable closure without arousing the suspicions of the end user.

Hence, it has become desirable by the end users to be able to check containers containing liquid, solid, powder and other compounds for evidence of tampering before the end user opens the container. This ensures a proof of quality and purity for the end user who can be assured that the product is original and not a counterfeit product and made by the authentic manufacturer free of tampering by third parties.

To deal with the above issues, the containers are now being made tamper-evident. In this context, tamper evident means that it is readily evident from the appearance of the container closure whether or not the container has been previously opened. Thus, there exists a need to provide an end user with a sealed container having tamper evident features so that the end user is assured of the fact that the sealed container has visibly not been tampered with by a third party en route to the end user.

OBJECTS & SUMMARY OF THE INVENTION

A primary object of the present invention is to provide improved containers having tamper evident features with readily observable indications to an end user of any potential tampering.

Another object of the present invention is to provide an improved container having two tamper evident features which provides an end user with readily observable indications to distinguish between when the container has previously been opened for a normal use and when the container has been potentially exposed to any tampering.

Another object of the present invention to provide an improved tamper-evident cap or closure for containers with readily observable indications which is effective in use and relatively inexpensive to manufacture.

Another object of the present invention is to provide a cap/closure having an improved tamper evident feature comprising a first frangible strip which needs to be torn and pulled out of the cap to rotate and open up as a first tamper evident feature. The pulling out of the strip reveals a second strip having a colored layer—indicating that the cap has been opened and/or used and/or tampered with as a second tamper evident feature. This second inner strip having colored layer also acts as a measuring cup with its calibration included therein.

It is another object of the present invention to provide a new container and/or bottle structure having a shape slicing off one or more edge(s) thereof giving it a chamfered edge and having one or more faces including at least one facet for product category with textures providing firm grip to hold.

It is another object of the present invention to provide a new container and/or bottle structure having chamfered edges with at least one facet for product category providing firm grip to hold. The chamfered edges run through the bottle creating a curved profile opposite to said facet.

Yet another object of the present invention to provide a pouring mechanism comprising a pouring cup having inner pouring flaps being added in the neck of the container that aids in pouring the contents therein, for example any liquid content and which also acts as a spill-proof mechanism—letting the liquid content pour back inside the bottle rather than dripping outside after pouring out.

A further object of the present invention is to provide an improved container capable of preserving the contents with its intended quality without the need for any additional seal.

Accordingly, the present invention relates to a container having tamper evident features comprising: a bottle having a neck with an opening at a distal end and a base at a proximal end thereof; a cap received on the neck and movably retained on the bottle wherein the cap includes a first tamper evident feature to provide an indication of tampering to an end user, the cap further includes a second tamper evident feature which becomes visible only when the first tamper evident feature removed partially or completely from the bottle.

The cap has a collar through which a first strip together with a tear tab is frangibly attached through one or more frangible members as a first tamper evident feature. The tear tab frangibly attached with the collar through a window formed in the collar.

A second inner strip fixedly received in a groove formed behind the collar as a second tamper evident feature.

In one of the embodiments, the bottle has a structure having chamfered edges with at least one facet for product category providing firm grip to hold. The chamfered edges run through the bottle creating a curved and/or half-cylindrical profile opposite to said facet. The chamfered edges run from the base to top encircling the neck of the bottle opposite to the facet.

The cap having a shape with internal holding space with a measuring cup formation to hold a measurable volume of the content of the bottle.

The container further comprising a pouring cup having inner pouring flaps with spill-proof mechanism which allows the liquid content pour back inside the bottle rather than dripping outside after pouring out. The pouring cup is snap fitted inside the opening of the bottle and received into the neck of the bottle.

BRIEF DESCRIPTION OF THE ACCOMPANYING DRAWINGS

Embodiments of the present disclosure now will be described more fully hereinafter with reference to the accompanying drawings. This present disclosure may, however, be embodied in many different forms and should not be construed as limited to the embodiments set forth herein. Rather, these embodiments are provided so that this disclosure will be thorough and complete, and will fully convey the scope of the claims to those skilled in the art. Like numbers refer to like elements throughout. The embodiments of the invention are described in the following description and in the accompanying drawings, wherein:

DETAILED DESCRIPTION OF THE INVENTION

The embodiments of the present invention relates to an improved container having tamper evident features with readily observable indications to an end user of any potential tampering. While this invention is susceptible of embodiments in many different forms, there will be described herein specific embodiments with the understanding that the present disclosure is to be considered as an exemplification of the principles of the invention and is not intended to limit the invention to the embodiments detailed herein.

As used herein, the term "proximal" refers to a region of the container or a location on the container which is closest to, for example, a user using the container. In contrast to this, the term "distal" refers to a region of the container which is farthest from the user, for example, the distal region of a container will be the region of the cap fitted on the container having tamper evident features.

Figure 1A:
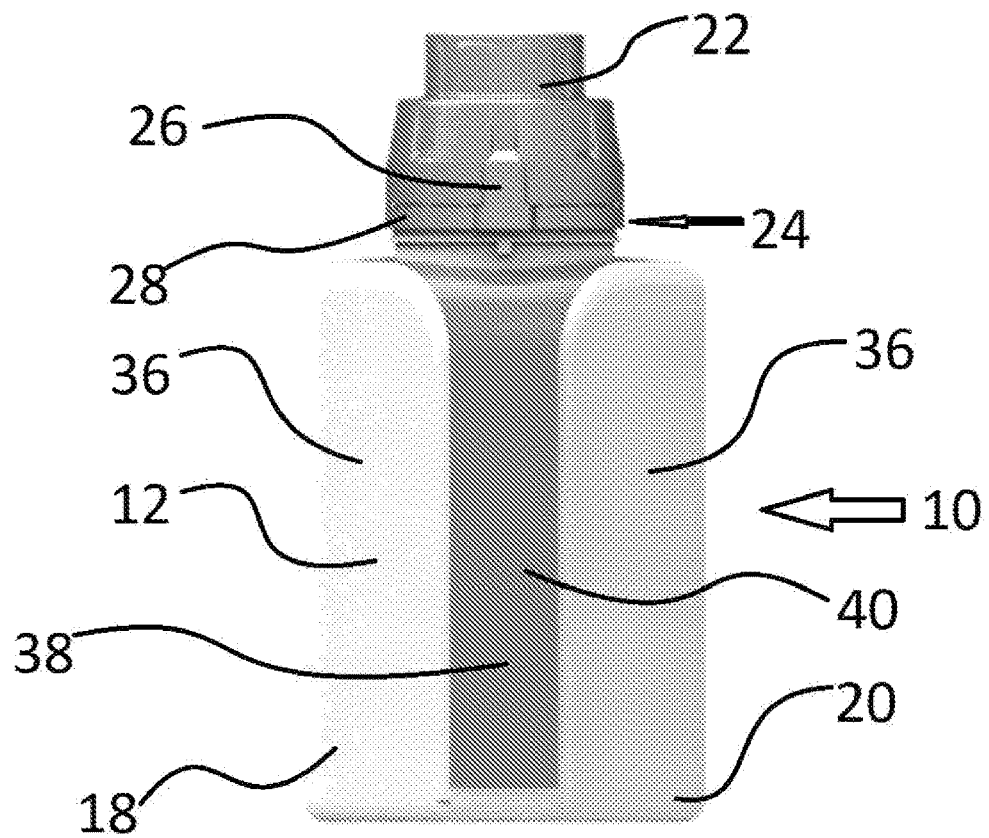
FIGS. 1A, 1B, 1C, 1D and 1E illustrate a front, back, side, top and perspective views respectively of an improved container having tamper evident features according to the present invention.
Figure 1B:
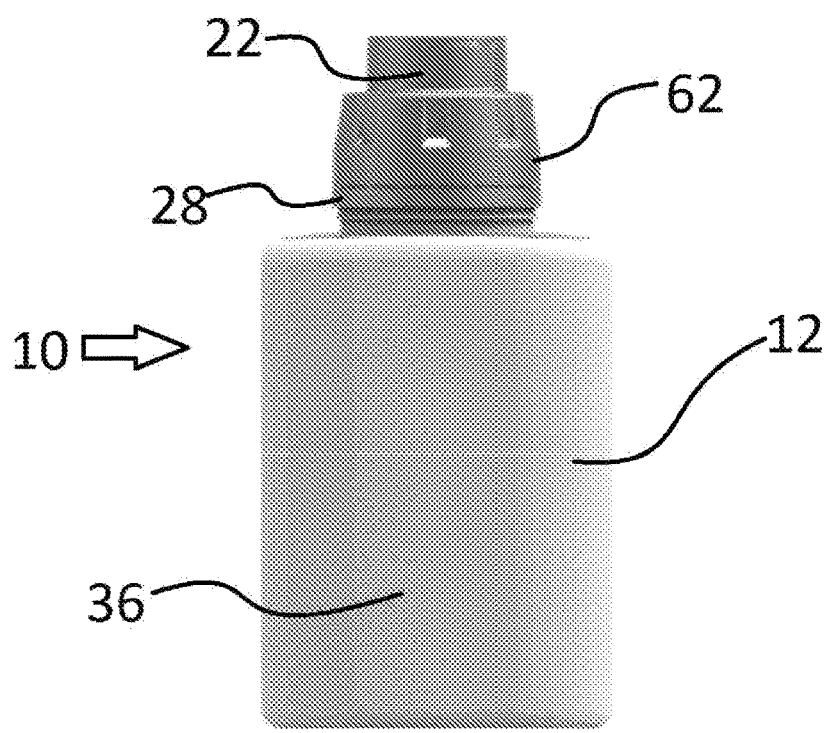
Figure 1C:
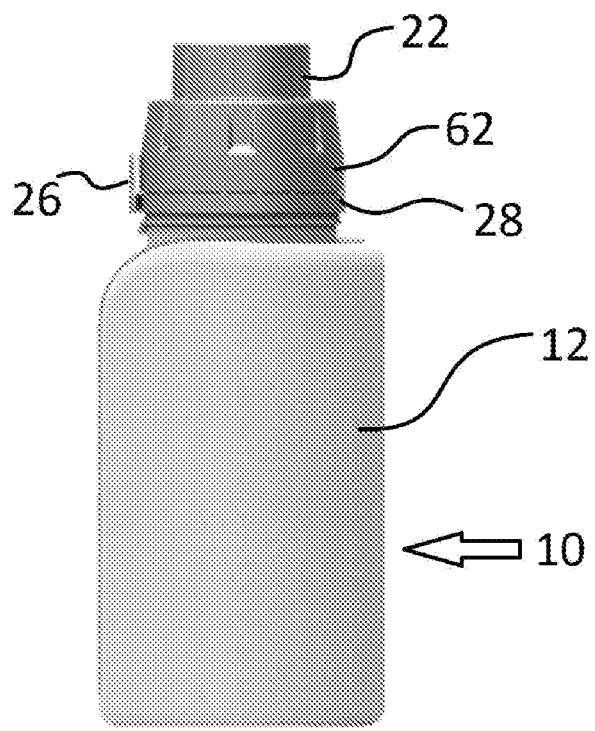
Figure 1D:
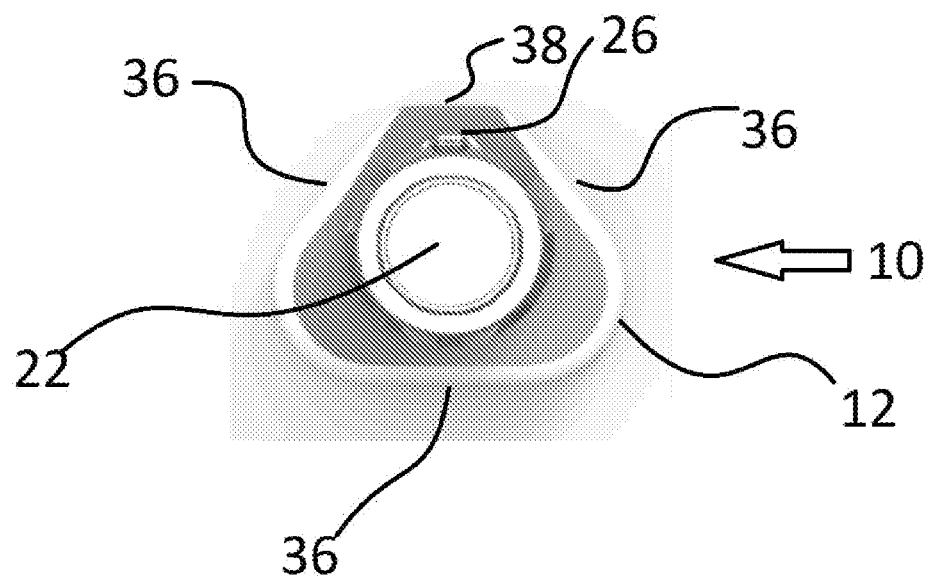
Figure 1E:
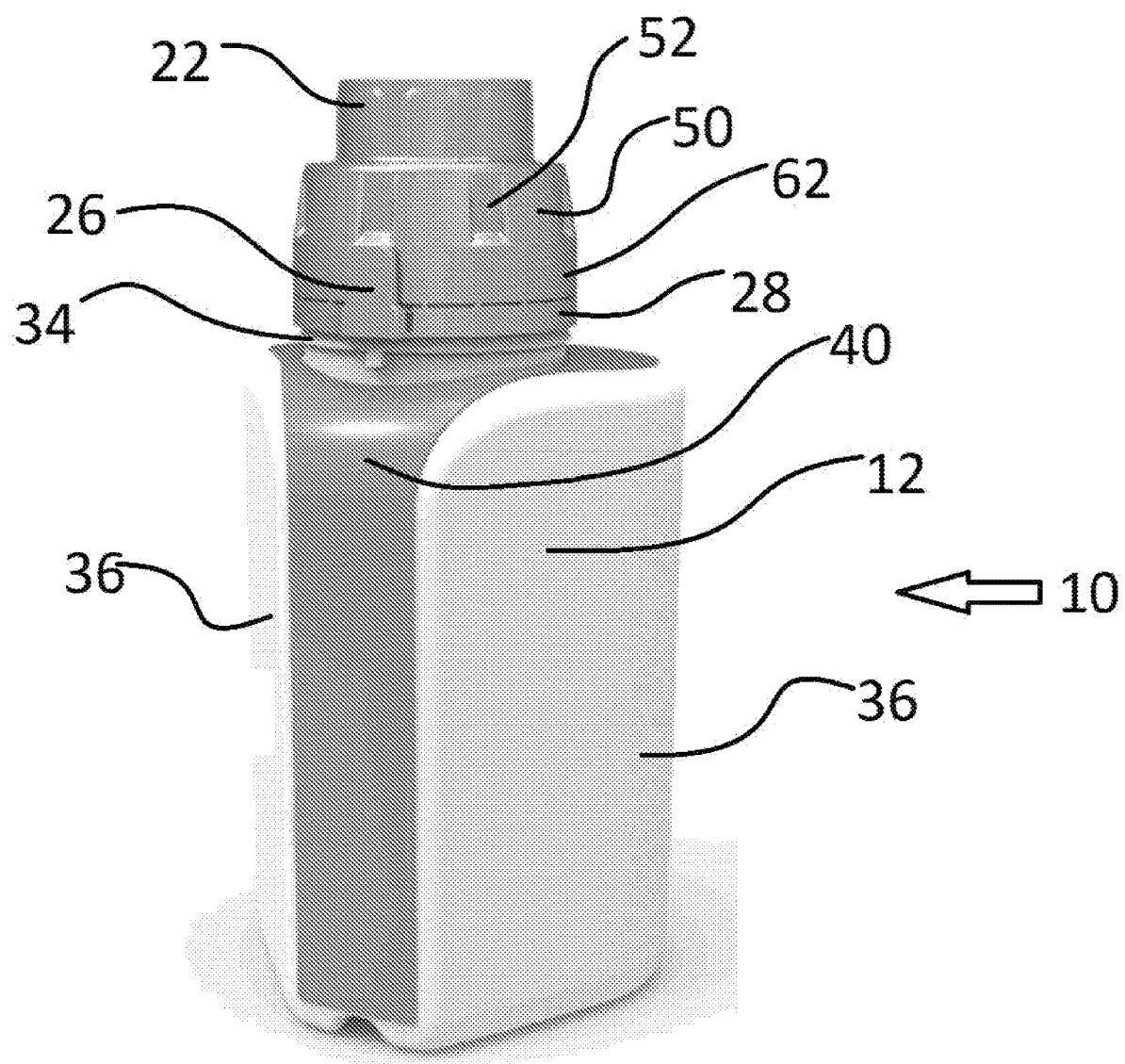
Figure 2:
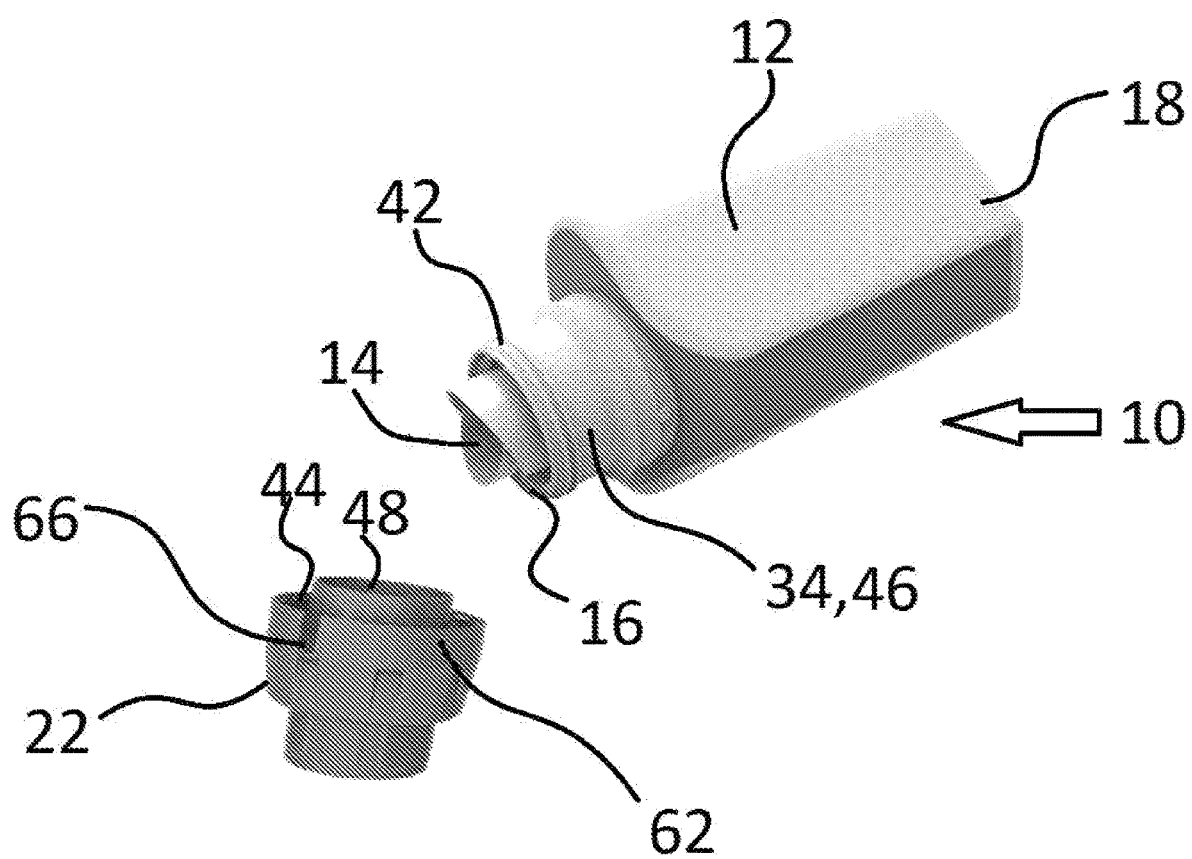
FIG. 2 illustrates a pouring position of the improved container of FIG. 1 showing the cap and/or closure.

The present invention now will be described with reference to FIGS. 1 to 7 wherein FIGS. 1A, 1B, 1C, 1D and 1E illustrate a front, back, side, top and perspective views respectively of the container embodying the present invention wherein the container 10 comprising a bottle 12 having a neck 34 with an opening 14 at a distal end 16 and a base 20 at a proximal end 18 thereof as shown in FIG. 2. The bottle 12 is capable to store a desired quantity of the content as per the need of a user. The bottle 12 is covered with a cap 22 to safely store the content within the bottle 12. The cap 22, thus prevents access to such content of the bottle 12. The cap 22 is received on the neck 34 of the bottle 12 and movably retained on the bottle 12 through spiral threads 42 shown in FIG. 2. For a mating engagement between the cap 22 and the bottle 12, the spiral thread 42 is provided on an inner wall 44 of the cap 22 and a corresponding mating spiral thread 42 is provided on the outer wall 46 of the neck 34 of the bottle 12 as can be seen in FIG. 2. The mating engagement means being utilized between the cap 22 and bottle 12 is not limited to spiral thread 42 and may include other arrangements such as snap fit or any other arrangements.

Figure 5A:
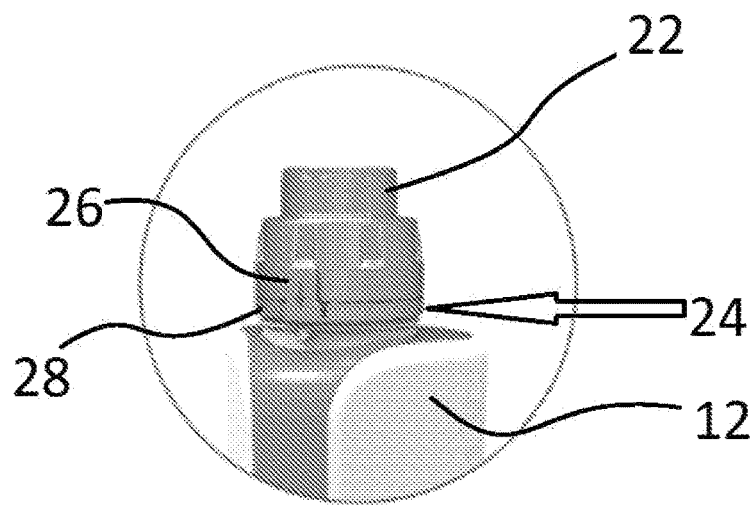
FIGS. 5A, 5B and 5C illustrate the two tamper evident features of improved container.
Figure 5B:
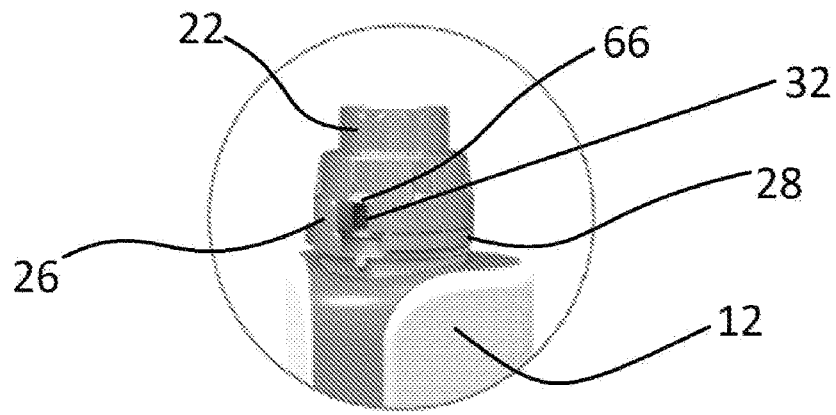
Figure 5C:
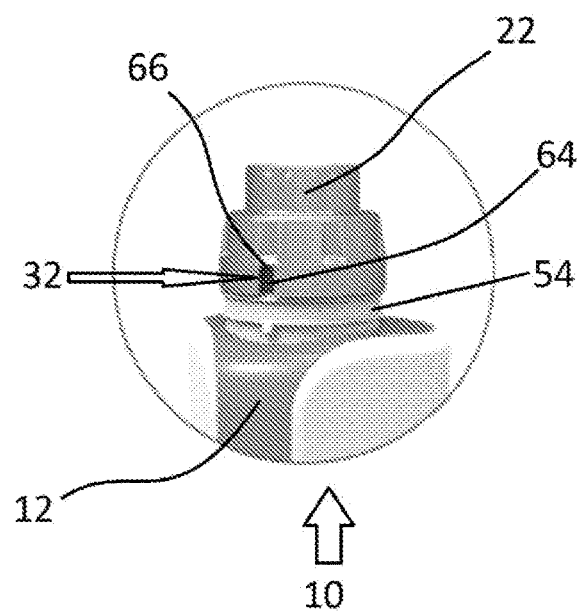
Figures 6A, 6B:
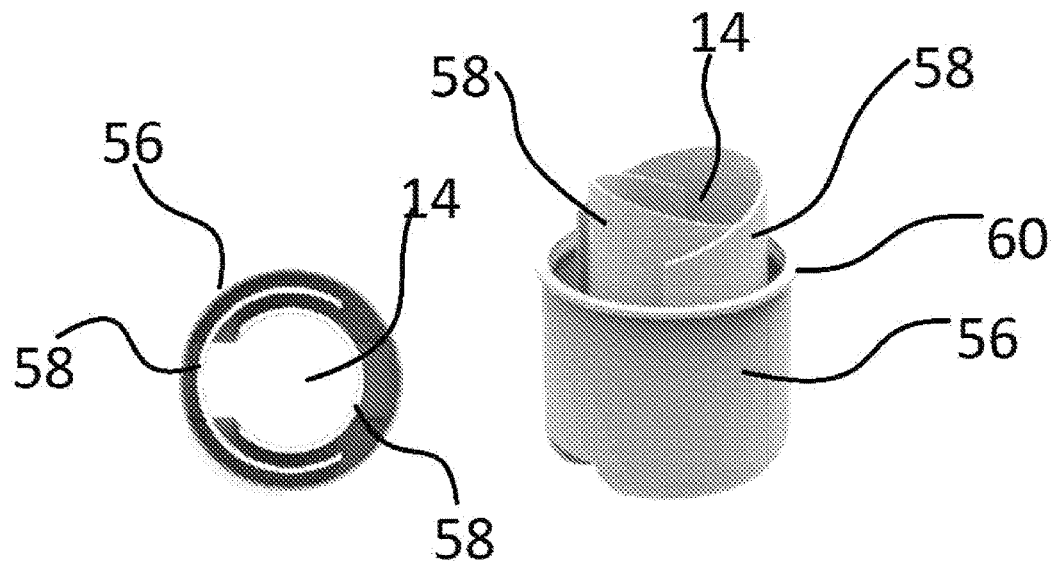
FIGS. 6A, 6B, 6C & 6D illustrate the top, perspective, front and back views respectively of a pouring cup having pouring flaps according to the present invention.
Figures 6C, 6D:
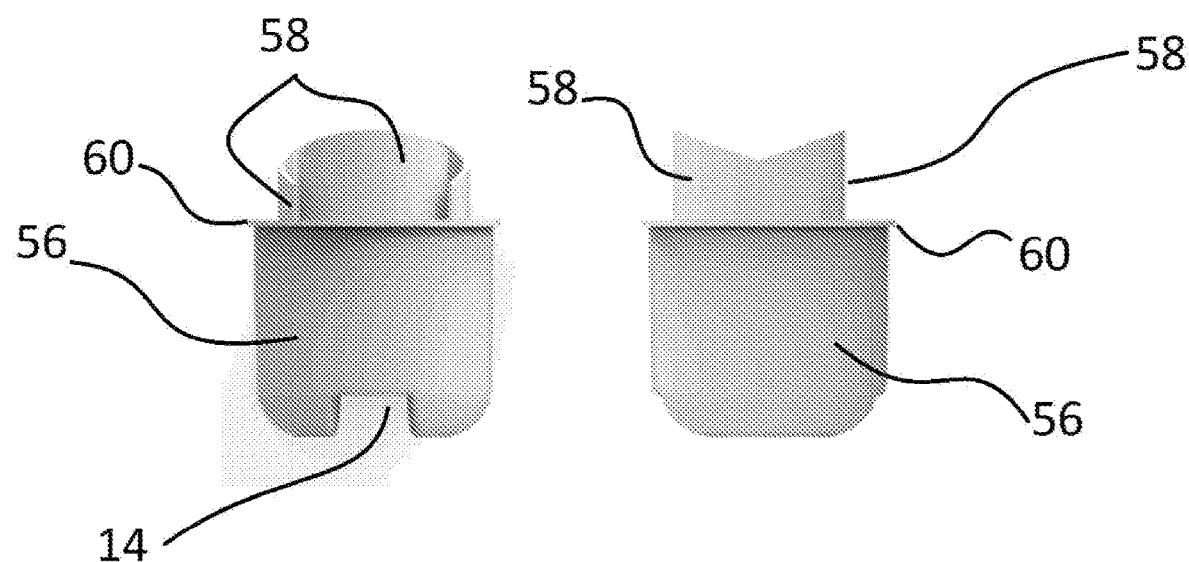

The cap 22 includes a first tamper evident feature 24 which is used to provide an indication of tampering to an end user. The first tamper evident feature 24 includes a tear tab 26 and a frangible strip 28 both being removably attached to a collar 62 of the cap 22 through one or more frangible members 30. The frangible members 30 are capable of being broken from the collar with optimum use of force needed to break away and providing sufficient rigidity while being connected with the collar 62. The combined pulling, rotation and/or flexing of the frangible members 30 causes their breaking. The frangible members 30 are both vertically and/or horizontally aligned and/or attached with the collar 62 of the cap 22. The construction of frangible member 30 is as such that it reduces the possibility that it will be undesirably broken. The bottle 12 is also provided with a second tamper evident feature 32 which becomes visible only when the first tamper evident feature 24 is removed partially or completely from the bottle 12 as can be seen in FIGS. 5A-5C and discussed in detail in coming paragraphs.

The bottle 12 has a structure having a shape slicing off one or more edge(s) thereof giving it a chamfered edge and having one or more faces 36 including at least one facet 38 for product category with textures providing firm grip to hold. However, the shape of the bottle 12 may include shapes having one or more edges for example, triangle, square, rectangular, semi-circular or cylindrical, pentagonal or the like and/or combination of such geometrical shapes and is not limited to a shape having edge(s) and may include other shapes without having edge(s) for example, oval, cylindrical and/or the like and/or a combination of such various shapes. A band 40 having the information related to the product/content of the bottle 12 is attached and covers the facet 38. The space of the faces 36 can also be used to include similar bands and/or stickers having the information relating to the product/content of the bottle 12.

Referring now to FIG. 2, a pouring position of the improved container 10 showing the cap 22 being removed from the bottle 12. As can be seen, the neck 34 on its outer wall 46 is provided with mating spiral threads 42 which movably engage with the spiral threads 42 of the cap 22. The cap 22 is having a shape with internal holding space 48 to hold a measurable volume of the content of the bottle 12. The outer wall 46 of the cap 22 has one and more projections 50 and recesses 52 shown in FIG. 1E facilitating finger grip to screw or unscrew the cap 22 from the bottle 12.

Figure 3:
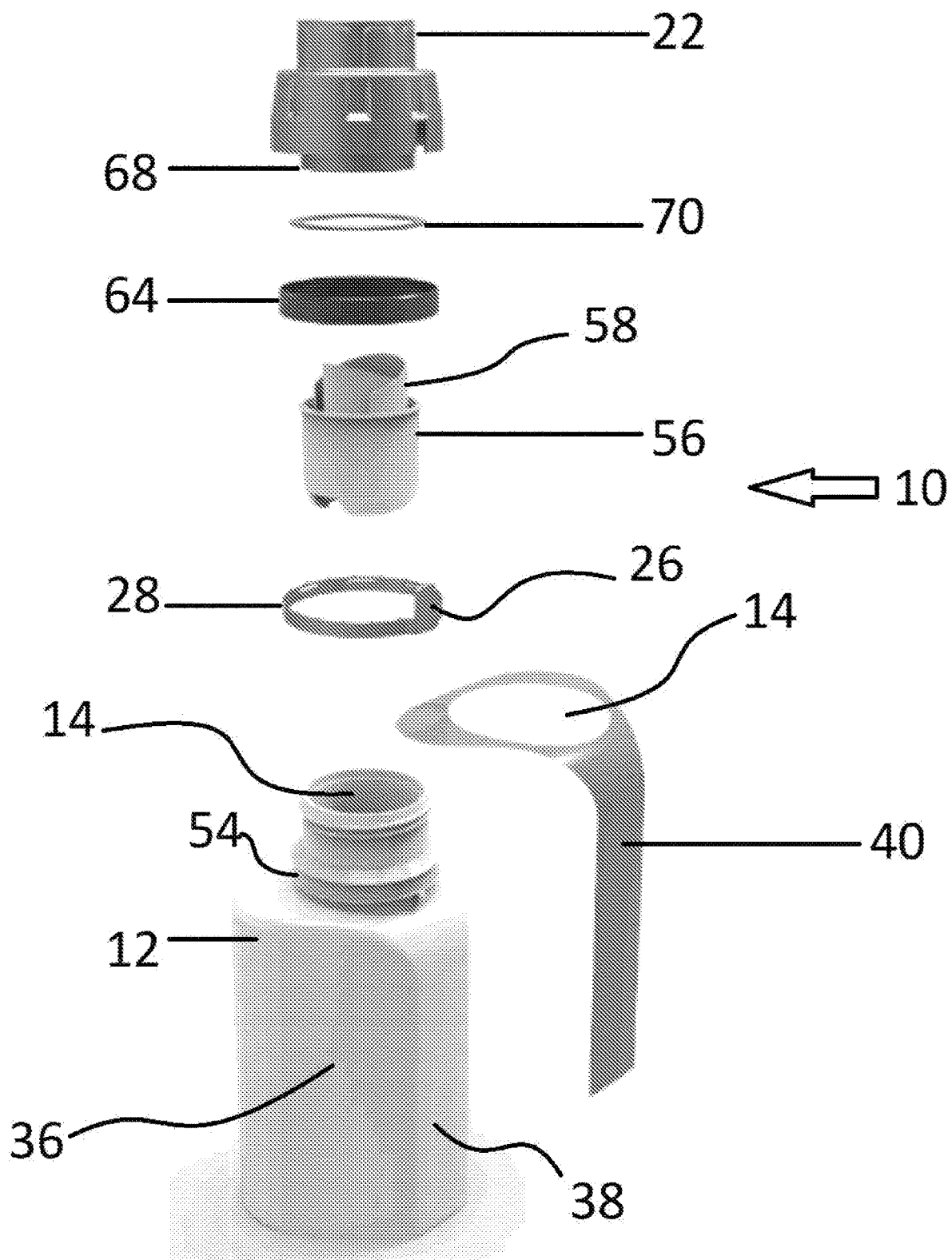
FIG. 3 illustrates an exploded view of the improved container of FIG. 1 showing the components thereof.
Figure 4:
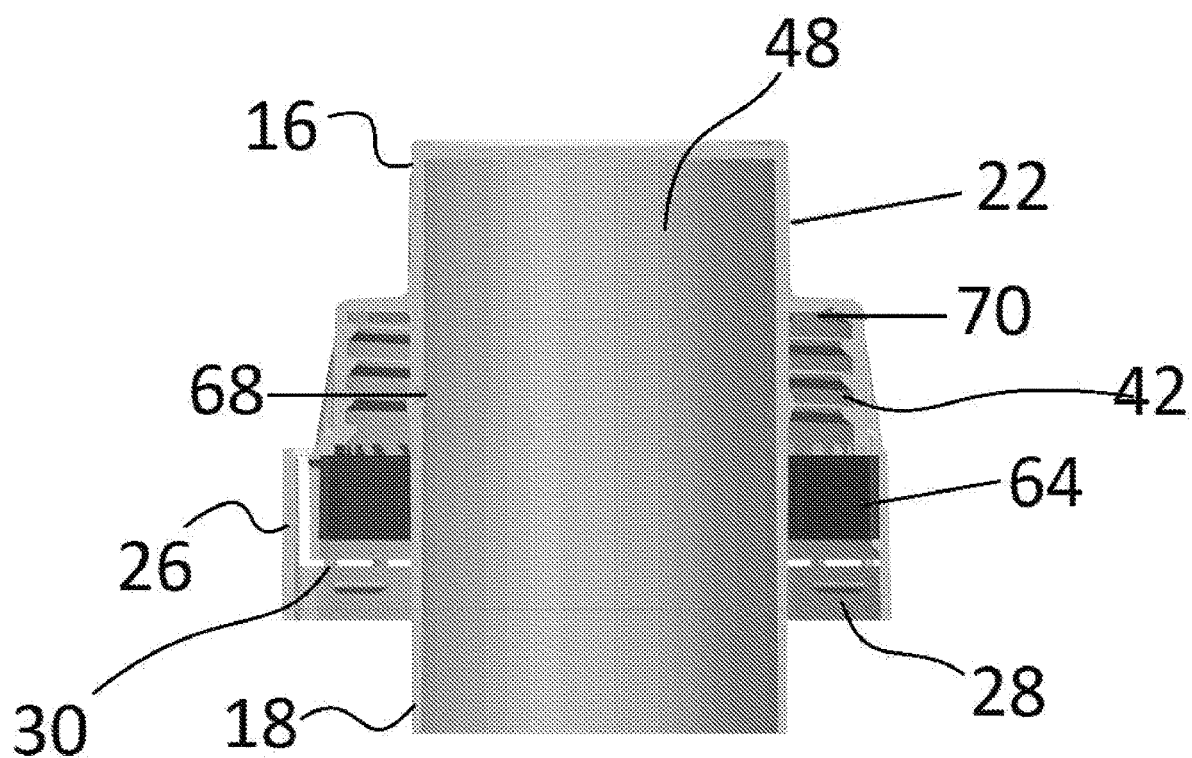
FIG. 4 illustrates a cross-sectional view of the cap and/or closure.
Figure 7:
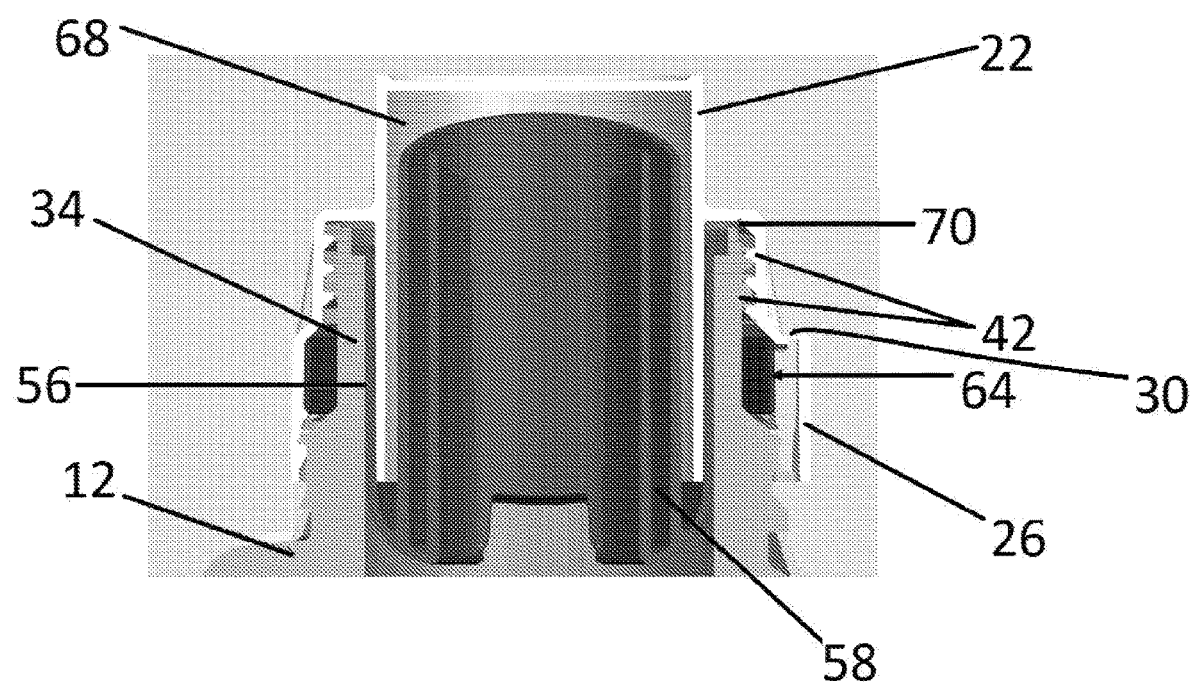
FIG. 7 illustrates a cross-sectional view of the cap fitted with the bottle having a pouring cup.
Figure 8:
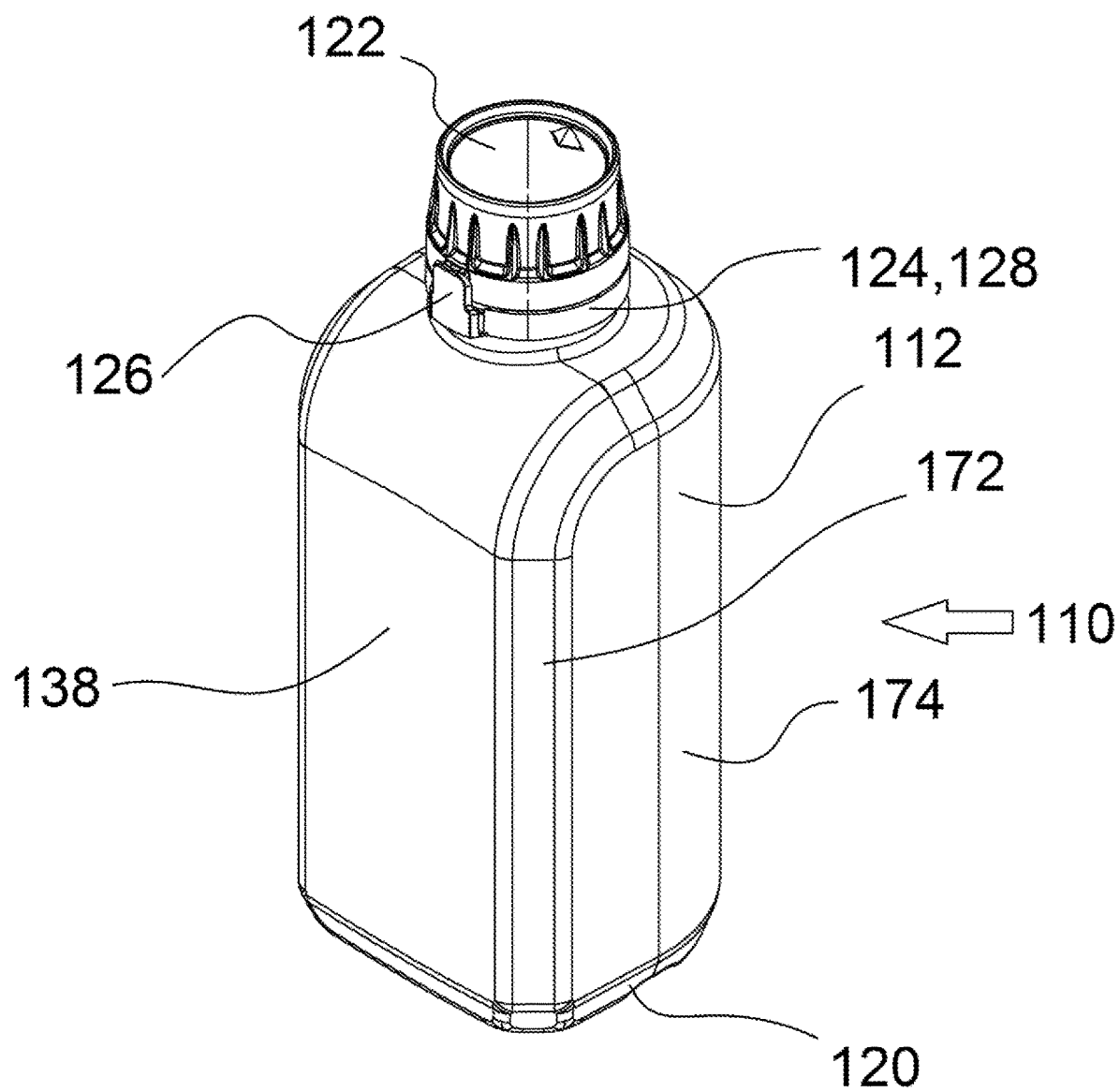
FIGS. 8, 9, 10, 11 and 12 illustrate a perspective, front, side, top and bottom views respectively of an improved container including a bottle fitted with a cap having tamper evident features according to another embodiment of the present invention.
Figure 9:
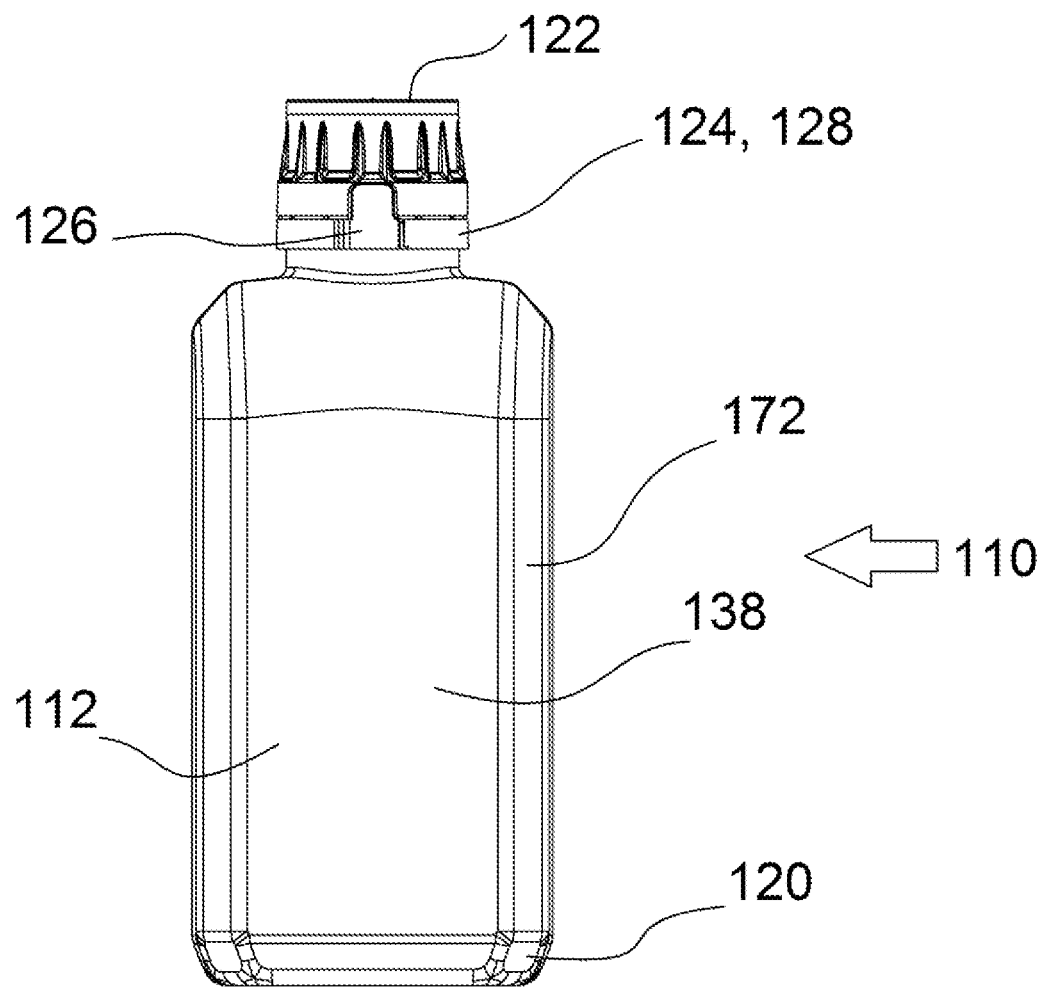
Figure 10:
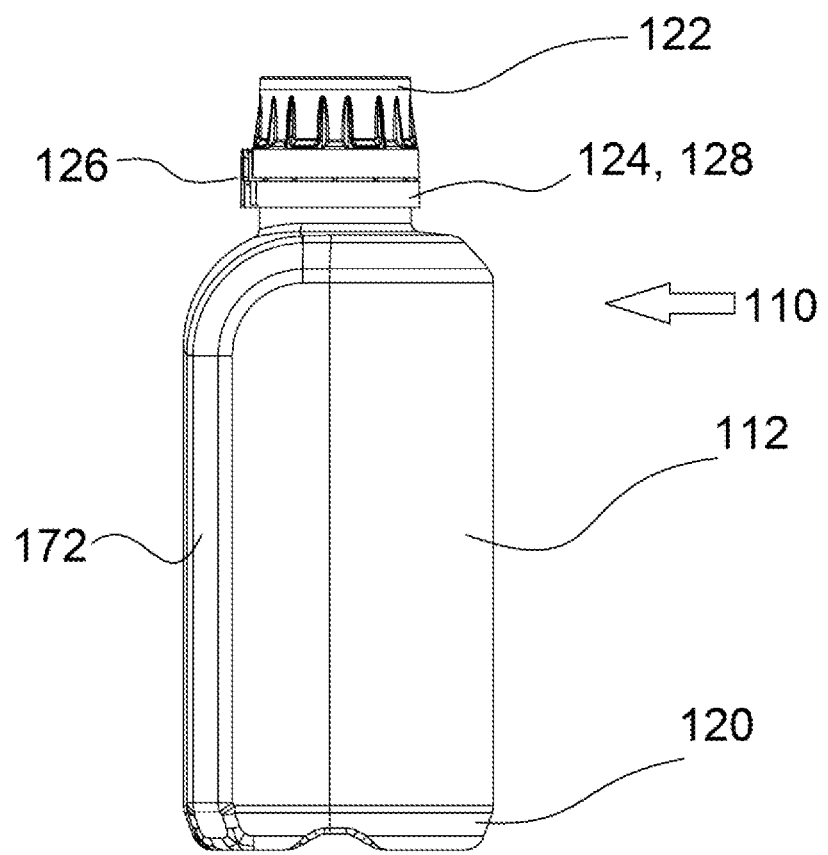
Figure 11:
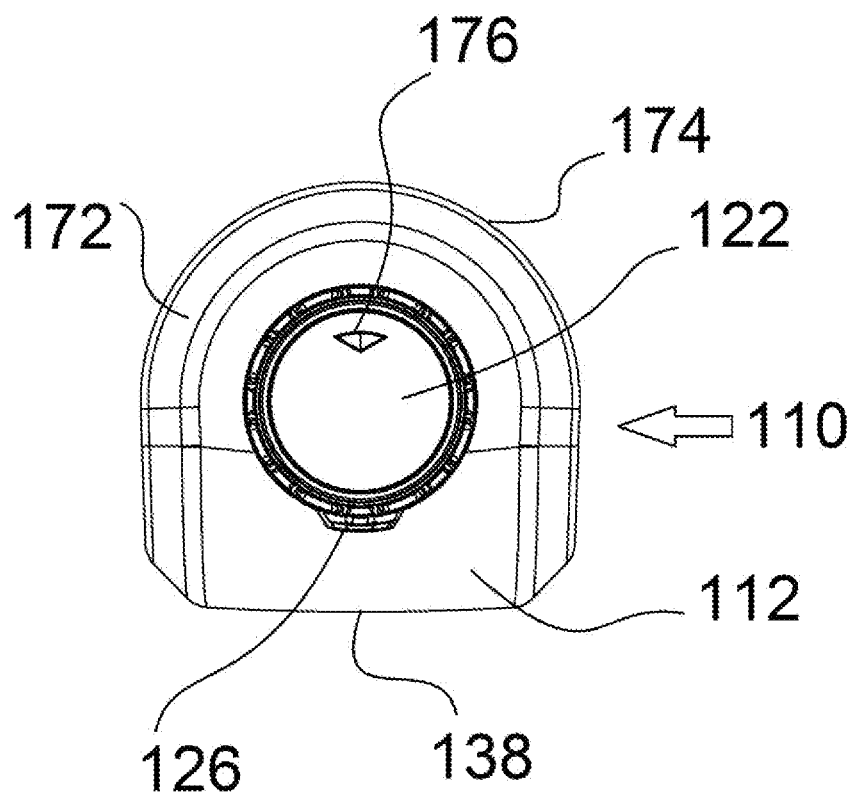
Figure 12:
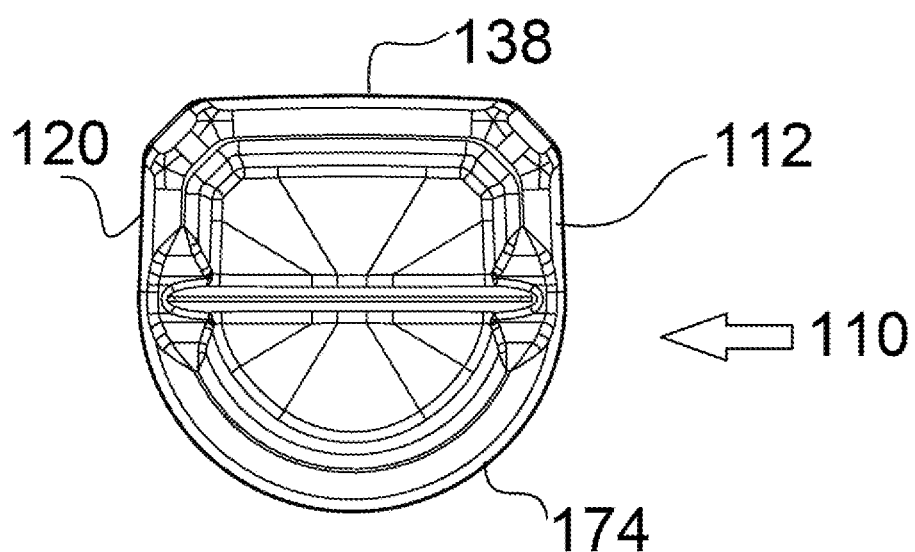

Referring now to FIG. 3, it illustrates an exploded view of the improved container 10 showing the components thereof. As can be seen in FIG. 7, the container 10 comprises a cap 22 which matingly engage with the neck 34 of the bottle 12. The bottle 12 has an opening to receive and/or pour the content therefrom. The outer wall 46 of the neck 34 in its distal end 16 region includes spiral threads 42 as shown in FIGS. 2, 4 and 7. Further, a groove 54 encircling the neck 34 is provided on outer wall 46 thereof in the proximal end 18 region as can be seen in FIG. 2.

As can be seen in FIGS. 6A-6D, the container 10 also includes a pouring mechanism comprising a pouring cup 56 having inner pouring flaps 58 being added in the neck 34 of the bottle 12 that aids in pouring the contents, for example any liquid content. The pouring cup 56 also acts as a spill-proof mechanism—letting the liquid content to pour back inside the bottle 12 rather than dripping outside after pouring out. The pouring cup 56 is snap fitted inside the opening 14 of the bottle 12 and received into the neck 34 of the bottle 12. The pouring cup 56 has a hollow profile having an opening 14 being in communication with the inner spacing of the bottle 12 allowing the content to be poured or received therethrough. The pouring cup 56 has a rim 60 in a distal end 16 region thereof. The rim 60 acts as a seal once the pouring cup 56 is snap fitted within the opening 14 of the bottle 12. The arrangement to fit pouring cup 56 with the bottle 12 is not limited to snap fit arrangement and may include other arrangements, for example through threads etc.

As can be further seen in FIGS. 4 and 7, the cap 22 is having a shape with internal holding space 48 to hold the content of the bottle 12. The internal holding space 48 preferably has a measuring cup formation 68 to hold a measured value of the content once it is poured therein. The outer wall 46 of the cap 22 has one and more projections 50 and recesses 52 facilitating finger grip to screw or unscrew the cap 22 from the bottle 12 as shown in FIG. 1E. The cap 22 has a collar 62 through which a first strip 28 together with a tear tab 26 is frangibly attached as a first tamper evident feature 24 through one or more frangible members 30 as shown in FIGS. 1A-1E and 4. The first strip 28 being frangible can be pulled out by use of a slight force by pulling out the tear tab 26. The tear tab 26 is frangibly attached with the collar 62 through a window 66 formed in the collar 62. Once the tear tab 26 is pulled out of the strip 28 it reveals a second strip 64 having a colored layer indicating that the cap 22 has been opened and/or used and/or tampered with as a second tamper evident feature 32 as can be seen in FIG. 5B. The appearance of a immediately identifiable colored layer of the second strip 64 provides a clear warning for the user that the container has been tampered with. This second inner strip 64 having the colored layer also acts as a measuring cup providing indication to a user with its calibration included therein. The colored layer of the second strip 64 provides a measuring layer for the content in the cup formation 68. The second inner strip 64 is fixedly received in a groove 54 formed behind the collar 62 such that once the tear tab 26 is pulled out the second inner strip 54 becomes visible through the window 66 provided in the collar 62. A washer 70 is fixedly arranged in between the collar 62 and measuring cup formation 68 which helps to prevent any leak or spillage once the bottle 12 is screw fitted with the cap 22. The washer 70 acts like a chemical resistance inbuilt sealing layer of cap 22.

The colored second strip 64 is not limited to only red color and can be of any color. The second strip 64 in addition to be being like a band to be fitted within the cap 22 can also be a flat strip part only arranged behind the portion of the window 66 in alternative embodiments.

As can be seen in FIGS. 1E and 3, a band 40 having the information related to the product/content of the bottle 12 is attached and covers the facet 38. The band 40 can be attached to the facet 38 with the help of glue and other known means. To be fixedly being attached with the facet 38, the band 40 at its distal end 16 region has an opening 14 through which the band 40 is fixedly received on the neck 34 of the bottle 12.

Referring now to FIGS. 5A, 5B and 5C they illustrate how the two tamper evident features of the improved container works. As can be seen in FIGS. 5A and 7, the cap 22 is matingly attached with the bottle 12. A tear tab 26 having a puffed profile is frangibly attached to the collar 62 of the cap 22 shown in FIG. 1E. The tear tab 26 is imprinted with an down arrow sign indicating the user to use a finger to pull the tear tab 26 out of the cap 22. In order to unscrew the cap 22, a user through his/her finger pulls out the tear tab 26 and due to its frangible attachment with the collar 62, the tear tab 26 comes out as can be seen in FIG. 5B indicating the second inner strip 64 through the window 66 formed in the collar 62. Thereafter, the first strip 28 can be pulled completely out of the cap 22 as can be seen in FIG. 5C unlocking the cap to be unscrewed. Thus, the tear tab 26 with the first strip 28 acts as a locking arrangement and also as a first tamper evident feature 24.

FIGS. 6A, 6B, 6C & 6D illustrate the top, perspective, front and back views respectively of a pouring cup 56 having pouring flaps 58. The pouring cup 56 also acts as a spill-proof mechanism—letting the liquid content pour back inside the bottle 12 rather than dripping outside after pouring out. In the present embodiment, the pouring cup (56) includes at least two pouring flaps (58) having a semi-circular curve shape in that one flap (58) is received within another flap (58) facing each other. The other and/or alternative embodiments may include more than two pouring flaps (58). The pouring cup 56 is snap fitted inside the opening 14 of the bottle. The pouring cup has a hollow profile having an opening 14 being in communication with the inner spacing of the bottle 12 allowing the content to be poured or received therethrough. The pouring cup 56 has a rim 60 in a distal end 16 region thereof. The rim 60 acts as a seal once the pouring cup 56 is snap fitted within the opening 14 of the bottle 12. The arrangement to fit pouring cup 56 with the bottle 12 is not limited to snap fit arrangement and may include other arrangements, for example through threads etc.

Figure 14:
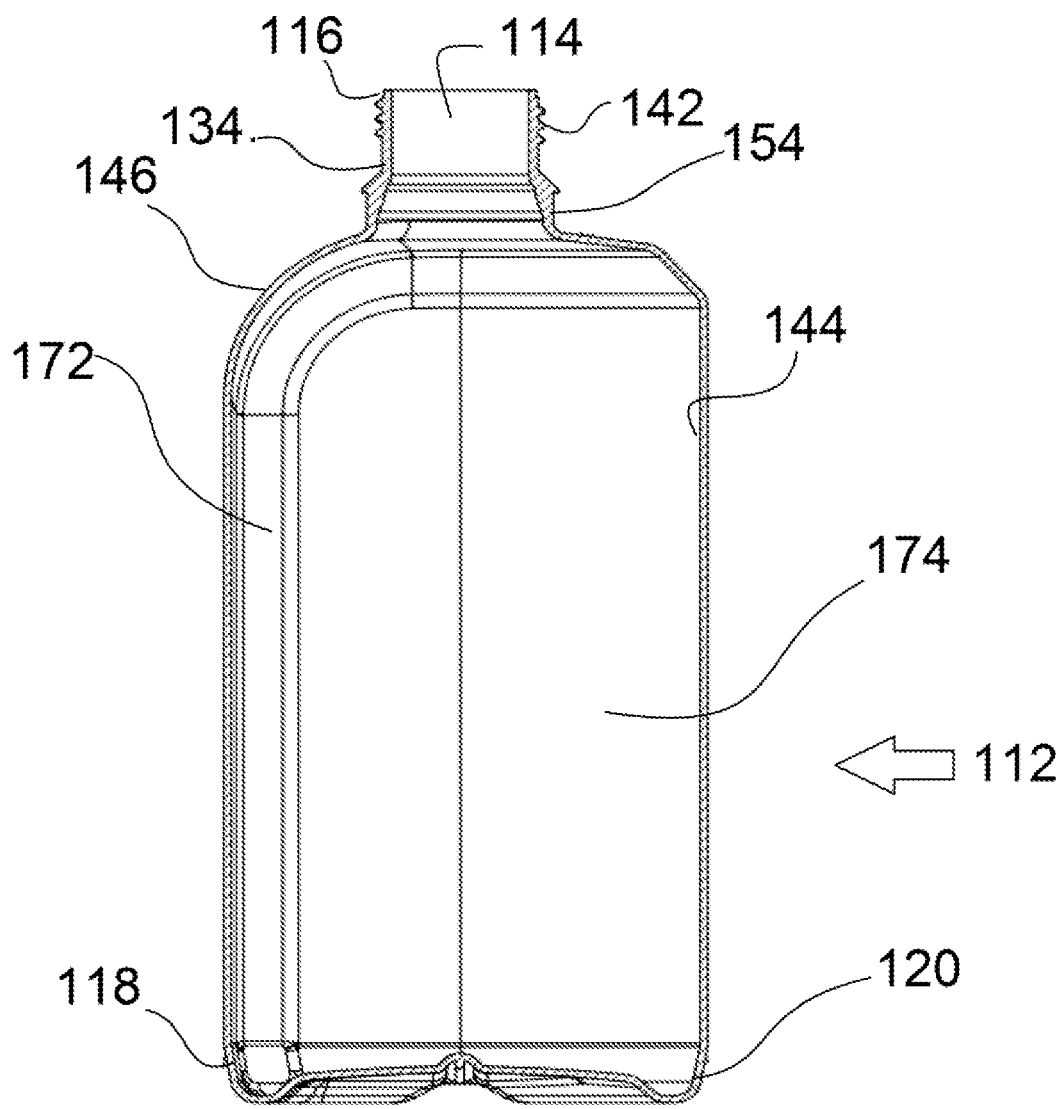
FIG. 14 illustrates a cross-sectional view of the bottle of FIGS. 8-12 according to the present invention.
Figure 15:
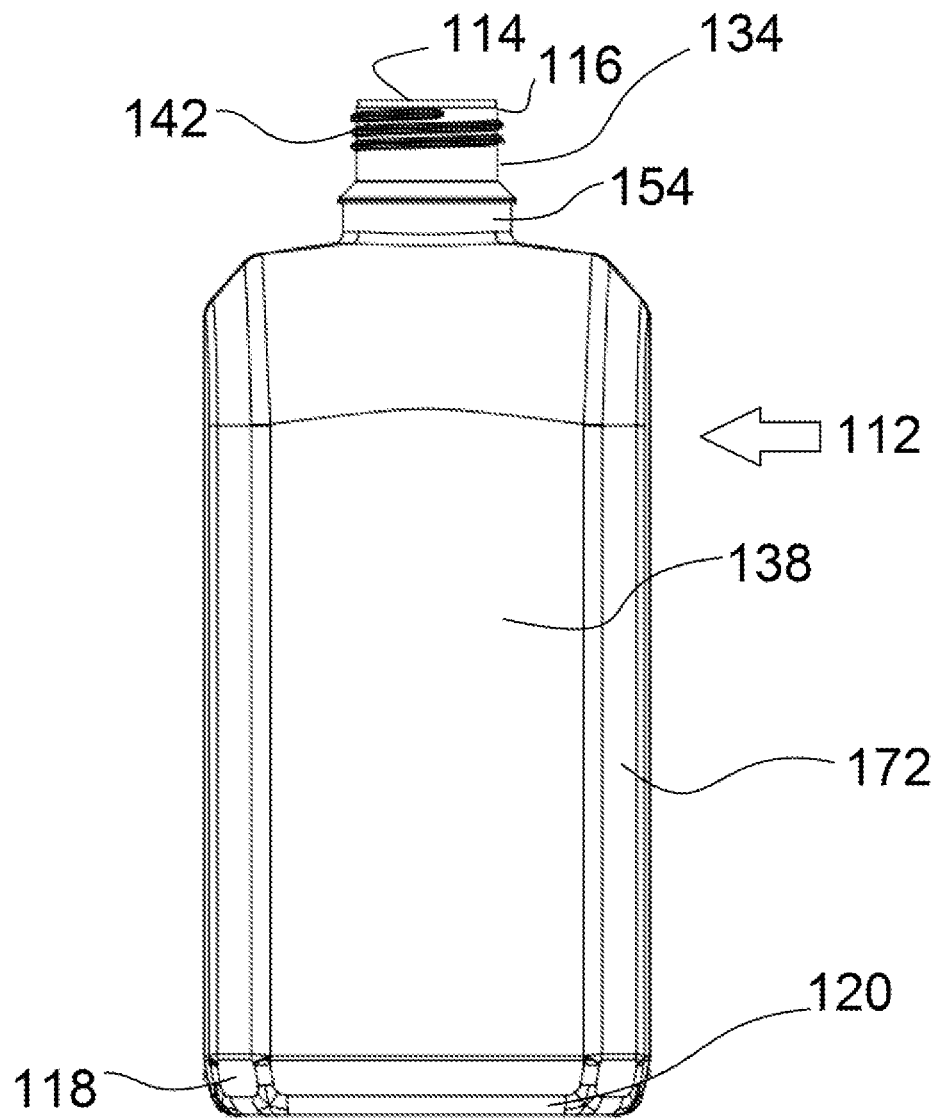
FIG. 15 illustrates a front view of the bottle of FIGS. 8-12 according to the present invention.
Figure 18:
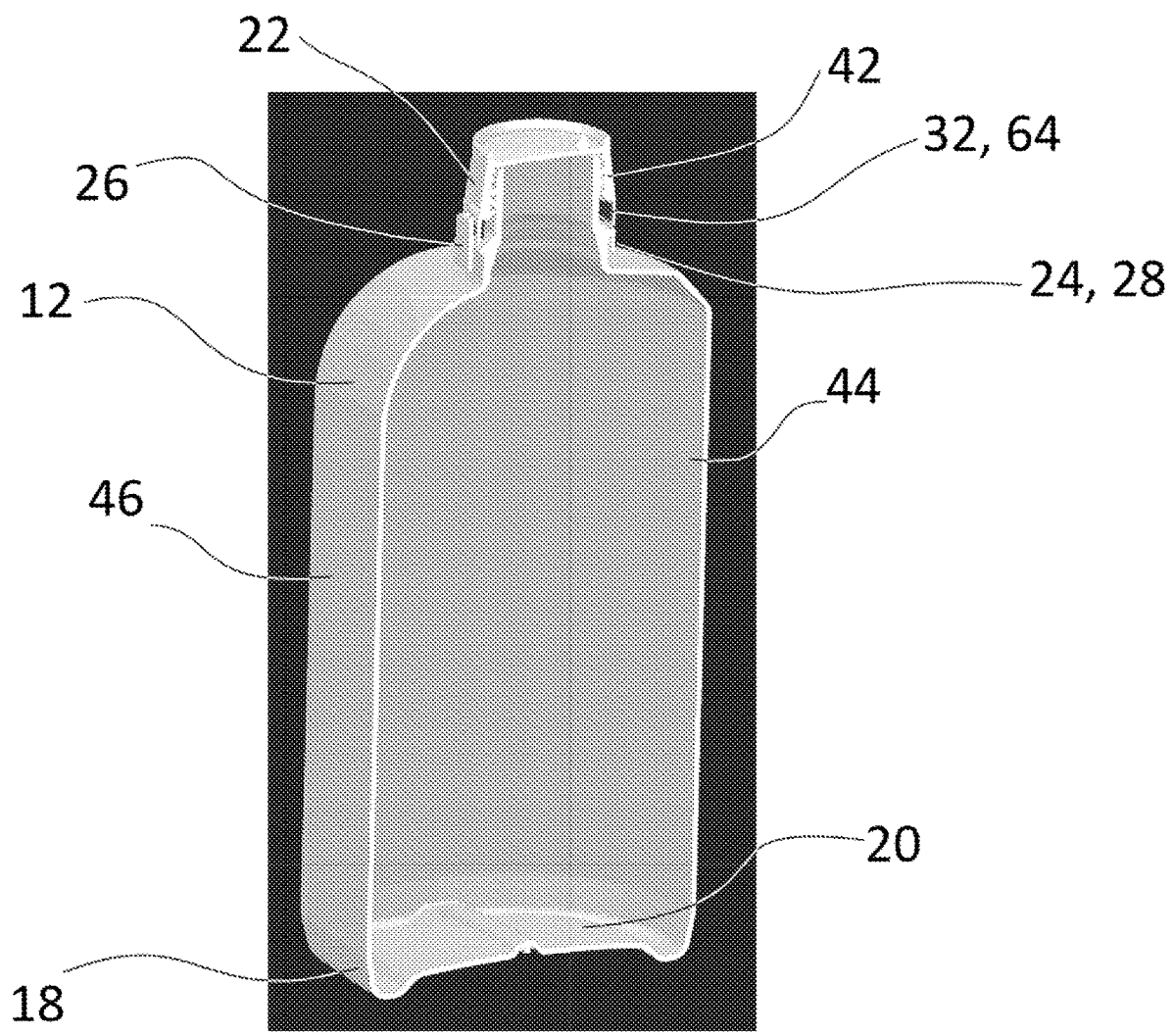
FIG. 18 illustrates a cross-sectional view of the improved container including a bottle fitted with a cap having tamper evident features according to another embodiment of the present invention.

The present invention now will be described with reference to FIGS. 8 to 17 wherein FIGS. 8, 9, 10, 11 and 12 illustrate a perspective, front, side, top and bottom views respectively of an improved container 110 including a bottle 112 fitted with a cap 122 having tamper evident features 124, 132 according to the present invention. The container 110 comprising a bottle 112 having a neck 134 with an opening 114 at a distal end 116 and a base 120 at a proximal end 118 thereof as shown in FIGS. 14 and 15. The bottle 112 is capable to store a desired quantity of the content as per the need of a user. The bottle 112 is covered with a cap 122 to safely store the content within the bottle 112. The cap 122, thus prevents access to such content of the bottle 112. The cap 122 is received on the neck 134 of the bottle 112 and movably retained on the bottle 112 through spiral threads 142 shown in FIG. 18. For a mating engagement between the cap 122 and the bottle 112, the spiral thread 142 is provided on an inner wall 144 of the cap 122 and a corresponding mating spiral thread 142 is provided on the outer wall 146 of the neck 134 of the bottle 112 as can be seen in FIG. 18. The mating engagement means being utilized between the cap 122 and bottle 112 is not limited to spiral thread 142 and may include other arrangements such as snap fit or any other arrangements.

The bottle 112 has a structure having chamfered edges 172 with at least one facet 138 for product category providing firm grip to hold. The chamfered edges 172 run through the bottle 112 creating a curved and/or half-cylindrical profile 174 opposite to said facet 138. The chamfered edges 172 run from the base 120 to top encircling the neck 134 of the bottle 112 opposite to the facet 138. However, the shape of the bottle 112 is not limited to the shape illustrated in drawings and may include other shapes as well such as triangle, square, rectangle, oval, cylindrical, semi-circular or cylindrical and/or the like and/or a combination of such various geometrical shapes. A band and/or stickers or the like having the information related to the product/content of the bottle 112 can be attached covering the facet 138. Thus, the space of the facet 138 and curved profile 174 can be used to include similar bands and/or stickers having the information relating to the product/content of the bottle 112.

The band or stickers can be attached to the facet 138 with the help of glue and other known means. To be fixedly being attached with the facet 138, the band at its distal end region can be provided with an opening through which the band is fixedly received on the neck 134 of the bottle 112.

Referring now to FIGS. 13A, 13B, 13C, 13D & 13E which illustrate perspective, front, side, top and bottom views respectively of the cap having tamper evident features according to the present invention. The cap 122 includes a first tamper evident feature 124 which is used to provide an indication of tampering to an end user. The first tamper evident feature 124 includes a tear tab 126 and a frangible strip 128 both being removably attached to a collar 162 of the cap 122 through one or more frangible members 130. The frangible members 130 are capable of being broken from the collar with optimum use of force needed to break away and providing sufficient rigidity while being connected with the collar 162. The combined pulling, rotation and/or flexing of the frangible members 130 causes their breaking. The frangible members 130 are both vertically and/or horizontally aligned and/or attached with the collar 162 of the cap 122. The construction of frangible member 130 is as such that it reduces the possibility that it will be undesirably broken. The bottle 112 is also provided with a second tamper evident feature 132 shown in FIG. 17 which becomes visible only when the first tamper evident feature 124 is removed partially or completely from the bottle 112 as can be seen in FIG. 18 and discussed in detail in coming paragraphs.

Figure 13A:
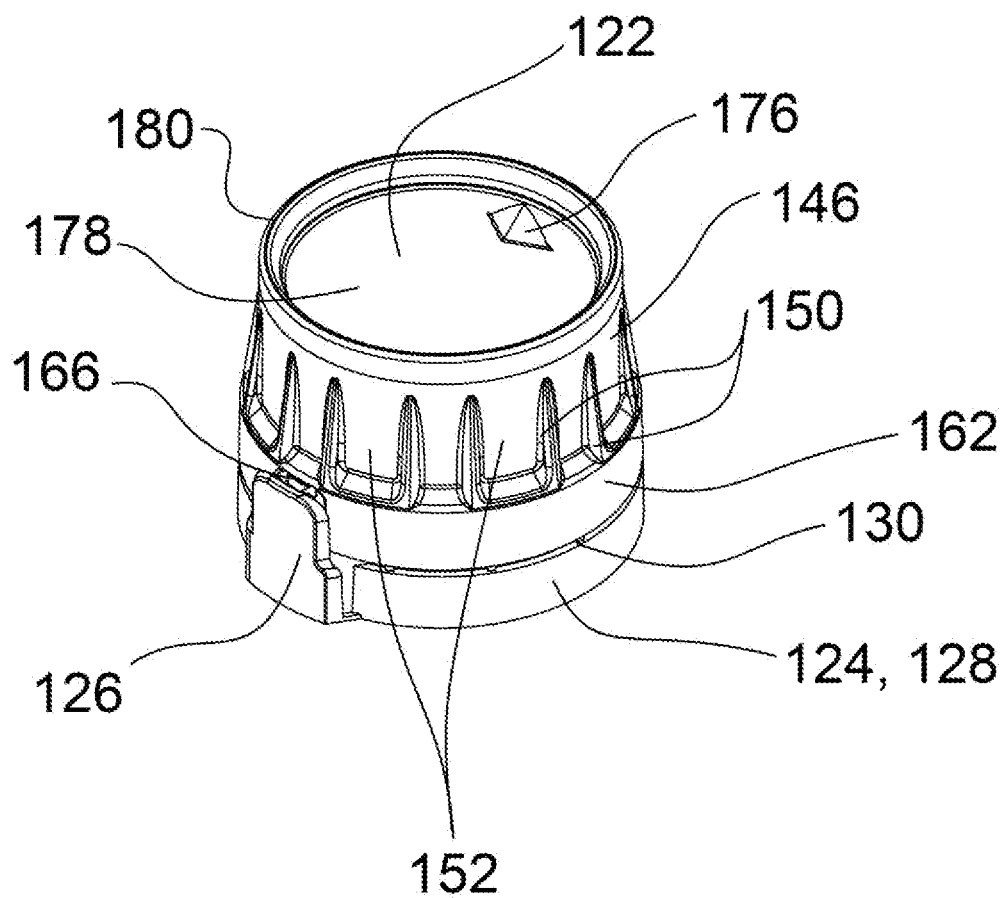
FIGS. 13A, 13B, 13C, 13D & 13E illustrate perspective, front, side, top and bottom views respectively of the cap having tamper evident features according to another embodiment of the present invention.

Further, as shown in FIG. 13A the cap 122 is provided with a cutting projection 176 on a top surface 178 thereof. The top surface 178 is at a depth creating a rim 180. The cutting projection 176 has a structure like an in-built edge which is used to cut the seal of bottle 112, for example an induction seal or the like. As can be seen, the cutting projection 176 is positioned closer to the rim 180 of the cap 122. However, the cutting projection 176 can be positioned at other locations of the cap 122, for example along the side of rim 180 on outer wall 146 of the cap 122. To use the cutting projection 176, the user needs to remove the cap 122 and reverse the cap 122 on the seal of the bottle 112. Once the cutting projection 176 is put over the seal, the reversed cap 122 is moved in a clock-wise or anti-clockwise direction on the seal to break it with the help of the edged portion of the cutting projection 176.

Figures 13B, 13C:
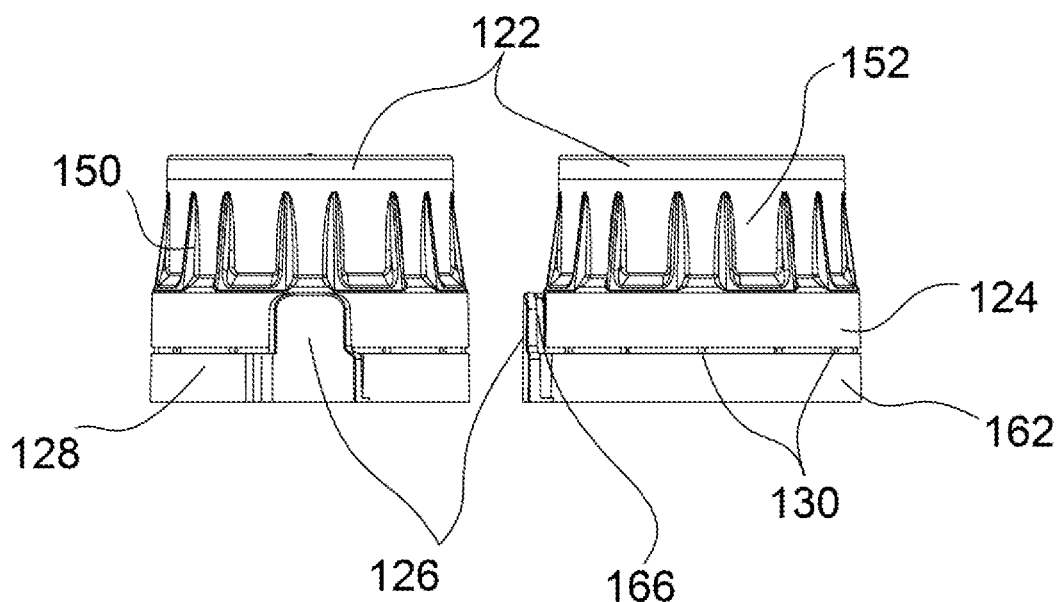
Figure 13D:
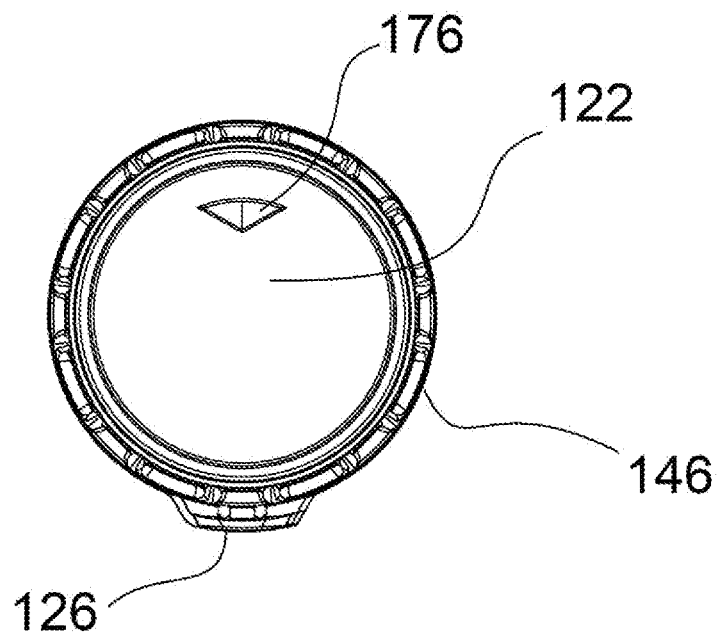
Figure 13E:
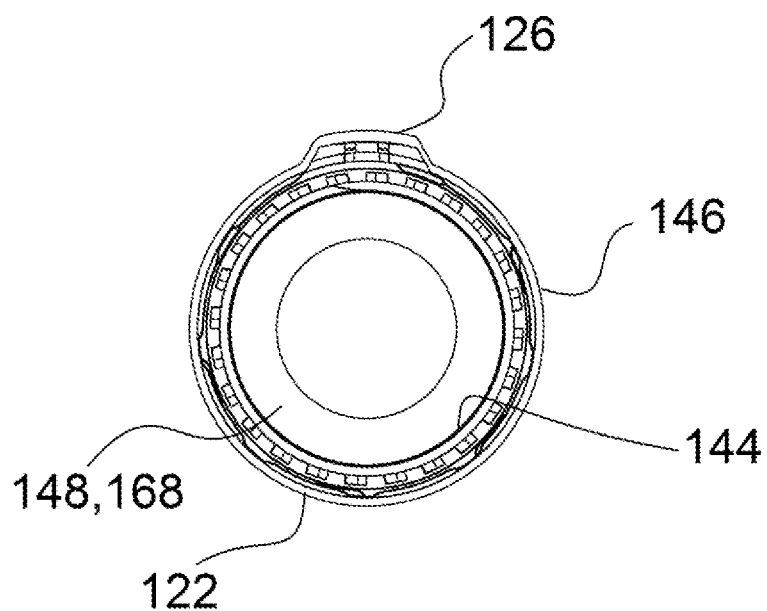
Figure 16:
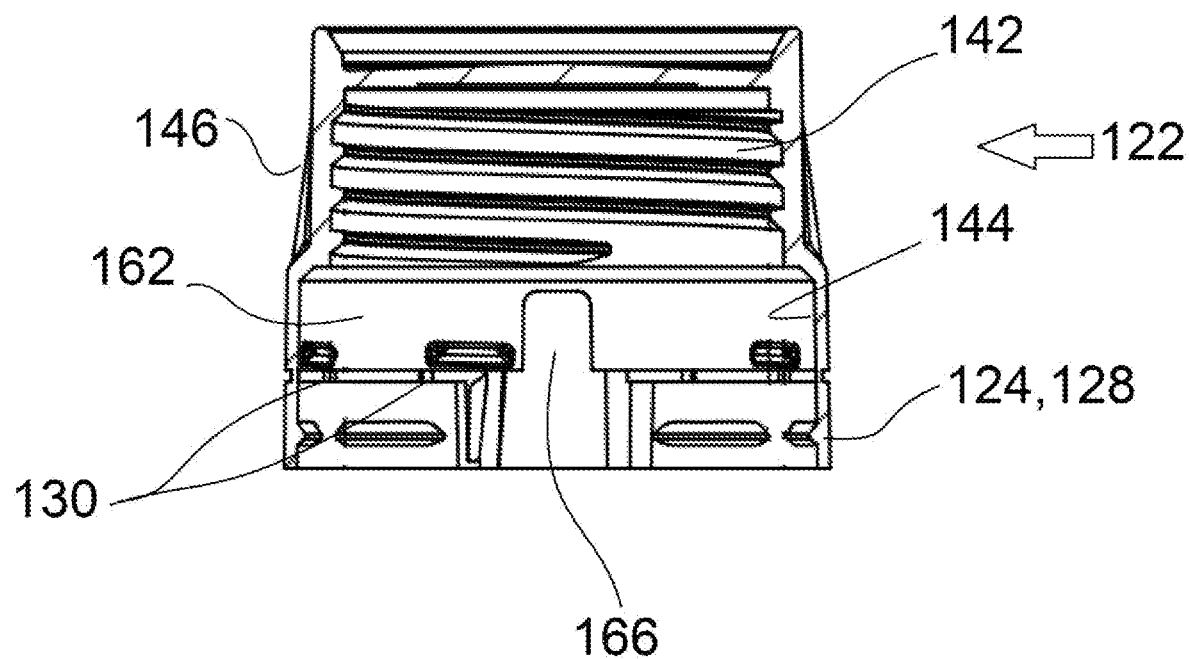
FIG. 16 illustrates a cross-sectional view of the cap of FIGS. 8-12 having tamper evident features according to the present invention.
Figure 17:
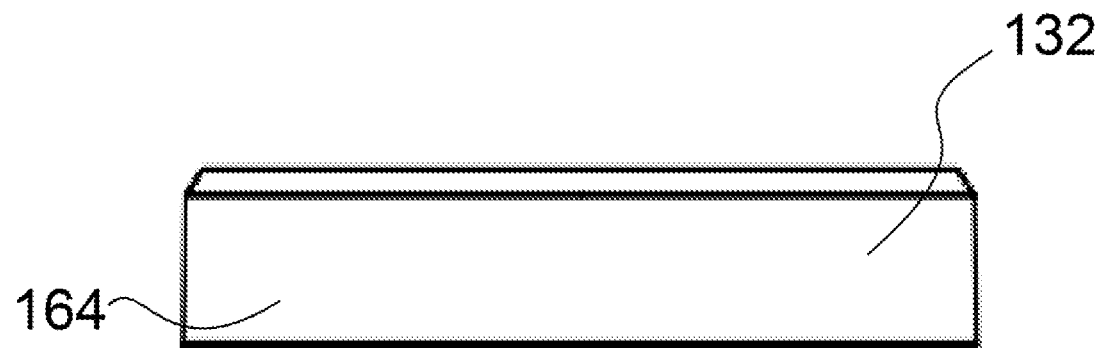
FIG. 17 illustrates a second tamper evident feature which is fixedly received on the bottle according to another embodiment of the present invention.

As can be further seen in FIGS. 13D and 13E, the cap 122 is having a shape with internal holding space 148 to hold the content of the bottle 112. The internal holding space 148 preferably has a measuring cup formation 168 to hold a measured value of the content once it is poured therein. The outer wall 146 of the cap 122 has one and more projections 150 and recesses 152 facilitating finger grip to screw or unscrew the cap 122 from the bottle 112 as shown in FIGS. 13A-13C. The cap 122 has a collar 162 through which a first strip 128 together with a tear tab 126 is frangibly attached as a first tamper evident feature 124 through one or more frangible members 130 as shown in FIGS. 13A-13C. The first strip 128 being frangible can be pulled out by use of a slight force by pulling out the tear tab 126. The tear tab 126 is frangibly attached with the collar 162 through a window 166 formed in the collar 162 as shown in FIG. 16. Once the tear tab 126 is pulled out of the strip 128 it reveals a second strip 164 having a colored layer indicating that the cap 122 has been opened and/or used and/or tampered with as a second tamper evident feature 132 as can be seen in FIG. 18. The appearance of a immediately identifiable colored layer of the second strip 164 provides a clear warning for the user that the container has been tampered with. This second inner strip 164 having the colored layer also acts as a measuring cup providing indication to a user with its calibration included therein. The colored layer of the second strip 164 provides a measuring layer for the content in the cup formation 168. The second inner strip 164 is fixedly received in a groove 154 formed behind the collar 162 such that once the tear tab 126 is pulled out the second inner strip 154 becomes visible through the window 166 provided in the collar 162. A washer not shown can also be provided which is fixedly arranged within the cap at inner distal end portion in between the collar 162 and measuring cup formation 168 which helps to prevent any leak or spillage once the bottle 112 is screw fitted with the cap 122. The washer acts like a chemical resistance inbuilt sealing layer of cap 122.

Referring now to FIGS. 14, 15 and 18, the neck 134 on its outer wall 146 is provided with mating spiral threads 142 which movably engage with the spiral threads 142 of the cap 122. The cap 122 is having a shape with internal holding space 148 to hold a measurable volume of the content of the bottle 112 as shown in FIG. 13E. The outer wall 146 of the cap 122 has one and more projections 150 and recesses 152 shown in FIGS. 13A-13C and FIG. 16 facilitating finger grip to screw or unscrew the cap 122 from the bottle 112.

As can be seen in FIG. 18, the container 110 comprises a cap 122 which matingly engage with the neck 134 of the bottle 112. The bottle 112 has a opening to receive and/or pour the content therefrom. The outer wall 146 of the neck 134 in its distal end 116 region includes spiral threads 142 as shown in FIGS. 14 and 15. Further, a groove 154 encircling the neck 134 is provided on outer wall 146 thereof in the distal end 116 which fixedly receives the second tamper evident feature 132 as can be seen in FIG. 110. The second tamper evident feature 132 can be a ring or a strip 164 which is colored for a quick attention and detection.

The colored second strip 132, 164 is not limited to only red color and can be of any color. As stated earlier, the second strip 164 in addition to be being like a band to be fitted within the cap 122 can also be a flat strip part only arranged behind the portion of the window 166 in alternative embodiments.

Referring now to FIG. 18, it illustrates how the two tamper evident features of the improved container works. As can be seen in FIG. 18, the cap 122 is matingly attached with the bottle 112. A tear tab 126 having a puffed profile is frangibly attached to the collar 162 of the cap 122 shown in FIG. 13A-13C. The tear tab 126 can be imprinted with user indications, for example an down arrow sign indicating the user to use a finger to pull the tear tab 126 out of the cap 122. In order to unscrew the cap 122, a user through his/her finger pulls out the tear tab 126 and due to its frangible attachment with the collar 162, the tear tab 126 can be pulled out indicating the second inner strip 164 through the window 166 formed in the collar 162. Thereafter, the first strip 128 can be pulled completely out of the cap 122 unlocking the cap to be unscrewed. Thus, the tear tab 126 with the first strip 128 acts as a locking arrangement and also as a first tamper evident feature 124.

The improved container 10, 110 of the present invention may be embodied as a, injection-moulded product, preferably made from high-density poly-ethylene (HDPE) or low-density poly-ethylene (LDPE), or a suitable plastic material or other materials including paper, fibre, glass, metal such as aluminium, steel etc., composite materials and/or a combination thereof. The improved container 110 being multilayered is produced by co-extrusion process or the like.

It will be understood that although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof Unless otherwise defined, all terms (including technical and scientific terms) used herein have the same meaning as commonly understood by one of ordinary skill in the art to which this present disclosure belongs. It will be further understood that terms used herein should be interpreted as having a meaning that is consistent with their meaning in the context of this specification and the relevant art and will not be interpreted in an idealized or overly formal sense unless expressly so defined herein.

| List of reference numerals: | |
|---|---|
| 10 | container |
| 12 | bottle |
| 14 | opening |
| 16 | distal end |
| 18 | proximal end |
| 20 | base |
| 22 | cap |
| 24 | first tamper evident feature |
| 26 | tear tab |
| 28 | first frangible strip |
| 30 | frangible members |
| 32 | second tamper evident feature |
| 34 | neck |
| 36 | faces |
| 38 | facet |
| 40 | band |
| 42 | spiral threads |
| 44 | inner wall |
| 46 | outer wall |
| 48 | internal holding space |
| 50 | projection |
| 52 | recess |
| 54 | groove |
| 56 | pouring cup |
| 58 | pouring flaps |
| 60 | rim |
| 62 | collar |
| 64 | second strip |
| 66 | window |
| 68 | measuring cup formation |
| 70 | washer |
| 110 | container |
| 112 | bottle |
| 114 | opening |
| 116 | distal end |
| 118 | proximal end |
| 120 | base |
| 122 | cap |
| 124 | first tamper evident feature |
| 126 | tear tab |
| 128 | first frangible strip |
| 130 | frangible members |
| 132 | second tamper evident feature |
| 134 | neck |
| 138 | facet |
| 142 | spiral threads |
| 144 | inner wall |
| 146 | outer wall |
| 148 | internal holding space |
| 150 | projection |
| 152 | recess |
| 154 | groove |
| 162 | collar |
| 164 | second strip |
| 166 | window |
| 168 | measuring cup formation |
| 172 | chamfered edges |
| 174 | curved profile |
| 176 | cutting projection |
| 178 | top surface |
| 180 | rim |

The invention claimed is:

1. A container (10) having tamper evident features comprising:
   a bottle (12) having a neck (34) with an opening (14) at a distal end (16) and a base (20) at a proximal end (18) thereof;
   a cap (22) received on the neck (34) and movably retained on the bottle (12) wherein the cap (22) includes a first tamper evident feature (24) to provide an indication of tampering to an end user, the cap (22) further includes a second tamper evident feature (32) which becomes visible only when the first tamper evident feature (24) is removed partially or completely from the bottle (12);

wherein the cap (22) has a collar (62) through which a first strip (28) together with a tear tab (26) is frangibly attached through one or more frangible members (30) as the first tamper evident feature (24); and wherein the tear tab (26) is frangibly attached with the collar (62) through a window (66) formed in the collar (62).

2. The container (10) as claimed in claim 1, wherein the bottle (12) has a structure having a shape slicing off one or more edge(s) thereof giving it a chamfered edge and having one or more faces (36) including at least one facet (38) for product category with textures providing firm grip to hold.

3. The container (10) as claimed in claim 1, wherein the neck (34) on its outer wall (46) is provided with mating spiral threads (42) which movably engage with the spiral threads (42) of the cap (22).

4. The container (10) as claimed in claim 1, wherein the cap (22) has a shape with internal holding space (48) with a measuring cup formation (68) to hold a measurable volume of the content of the bottle (12).

5. The container (10) as claimed in claim 1, wherein the cap (22) on its outer wall (46) has one or more projections (50) and recesses (52) facilitating finger grip to screw or unscrew the cap (22) from the bottle (12).

6. The container (10) as claimed in claim 1, further comprising a pouring cup (56) having inner pouring flaps (58) with a spill-proof mechanism which allows the liquid content pour back inside the bottle (12) rather than dripping outside after pouring out.

7. The container (10) as claimed in claim 6, wherein the pouring cup (56) is snap fitted inside the opening (14) of the bottle (12) and received into the neck (34) of the bottle (12).

8. The container (10) as claimed in claim 6, wherein the pouring cup (56) has a hollow profile having an opening (14) being in communication with the inner spacing of the bottle (12) and a rim (60) in a distal end (16) region thereof.

9. The container (10) as claimed in claim 6, wherein the pouring cup (56) includes at least two pouring flaps (58) having a semi-circular curve shape in that one flap (58) is received within another flap (58) facing each other.

10. The container (10) as claimed in claim 1, wherein a second inner strip (64) fixedly received in a groove (54) formed behind the collar (62) is the second tamper evident feature (32).

11. The container (10) as claimed in claim 1, wherein a washer (70) is fixedly arranged in between the collar (62) and measuring cup formation (68) which helps to prevent any leak or spillage once the bottle (12) is screw fitted with the cap (22).

12. A container (10) having tamper evident features comprising:
a bottle (12) having a neck (34) with an opening (14) at a distal end (16) and a base (20) at a proximal end (18) thereof;
a cap (22) received on the neck (34) and movably retained on the bottle (12) wherein the cap (22) includes a first tamper evident feature (24) to provide an indication of tampering to an end user, the cap (22) further includes a second tamper evident feature (32) which becomes visible only when the first tamper evident feature (24) is removed partially or completely from the bottle (12);
wherein a band (40) having information related to contents of the bottle (12) is attached and covers the facet (38); and
wherein the band (40) at its distal end (16) region has an opening (14) through which the band (40) is fixedly received on the neck (34) of the bottle (12).

13. A container (110) having tamper evident features comprising:
a bottle (112) having a neck (134) with an opening (114) at a distal end (116) and a base (120) at a proximal end (118) thereof;
a cap (122) received on the neck (134) and movably retained on the bottle (112) wherein the cap (122) includes a first tamper evident feature (124) to provide an indication of tampering to an end user, wherein the cap (122) further includes a second tamper evident feature (132) which becomes visible only when the first tamper evident feature (124) is removed partially or completely from the bottle (112);
wherein the cap (122) has a collar (162) through which a first strip (128) together with a tear tab (126) is frangibly attached through one or more frangible members (130) as the first tamper evident feature (124); and
wherein the tear tab (126) is frangibly is attached with the collar (162) through a window (166) formed in the collar (162).

14. The container (110) as claimed in claim 13, wherein the bottle (112) has a structure having chamfered edges (172) with at least one facet (138) for product category providing firm grip to hold.

15. The container (110) as claimed in claim 13, wherein the neck (134) on its outer wall (146) is provided with mating spiral threads (142) which movably engage with the spiral threads (142) of the cap (122).

16. The container (110) as claimed in claim 15, wherein the chamfered edges (172) run through the bottle (112) creating a curved and/or half-cylindrical profile (174) opposite to said facet (138).

17. The container (110) as claimed in claim 15, wherein the chamfered edges (172) run from the base (120) to top encircling the neck (134) of the bottle (112) opposite to the facet (138).

18. The container (110) as claimed in claim 13, wherein the cap (122) has a shape with internal holding space (148) with a measuring cup formation (168) to hold a measurable volume of the content of the bottle (112).

19. The container (110) as claimed in claim 13, wherein the cap (122) on its outer wall (146) has one or more projections (150) and recesses (152) facilitating finger grip to screw or unscrew the cap (122) from the bottle (112).

20. The container (110) as claimed in claim 13, wherein a second inner strip (164) is fixedly received in a groove (154) formed behind the collar (162) as the second tamper evident feature (132).

21. The container (110) as claimed in claim 20, wherein the second tamper evident feature (132) has a colored layer acting as a measuring cup with its calibration included therein.

22. The container (110) as claimed in claim 13, wherein a cutting projection (176) is provided on a top surface (178) of the cap (122).

23. The container (110) as claimed in claim 22, wherein the top surface (178) is at a depth creating a rim (180).

24. The container (110) as claimed in claim 22, wherein the cutting projection (176) is positioned closer to the rim (180) of the cap (122).

25. The container (110) as claimed in claim 13, wherein the container (110) made from high-density poly-ethylene (HDPE) or low-density poly-ethylene (LDPE), or a suitable plastic material or other materials including paper, fibre, glass, metal, composite materials and/or a combination thereof wherein the container (110) being multilayered is produced by co-extrusion process or the like.

\* \* \* \* \*